UNITED STATES PATENT OFFICE.

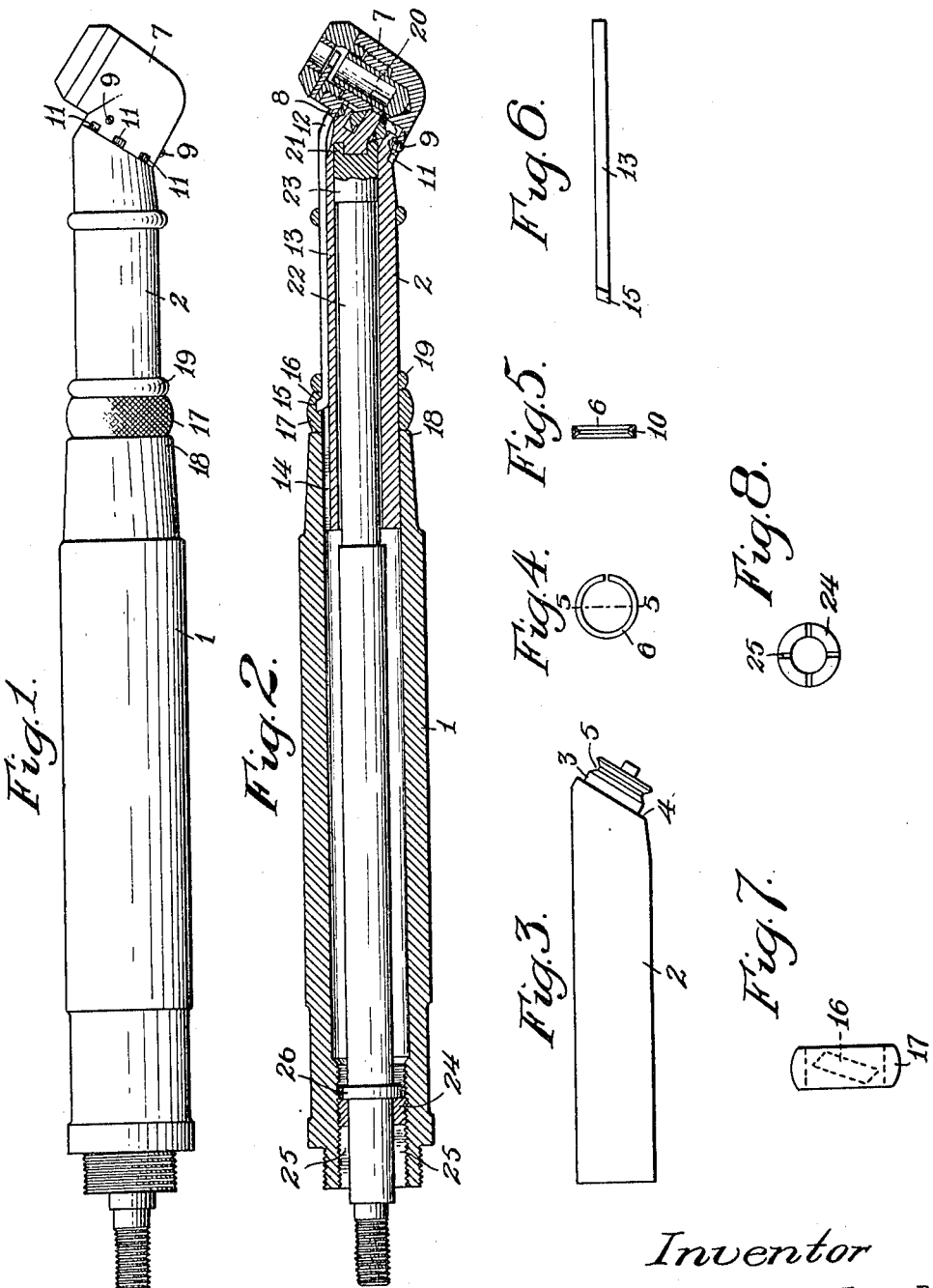

JAMES A. MacDONALD, OF BOSTON, MASSACHUSETTS.

ANGLE ATTACHMENT FOR DENTAL HANDPIECES.

1,039,420. Specification of Letters Patent. Patented Sept. 24, 1912.

Application filed April 12, 1909. Serial No. 489,289.

*To all whom it may concern:*

Be it known that I, JAMES A. MACDONALD, a citizen of the United States, residing at Boston, in the county of Suffolk and Commonwealth of Massachusetts, have invented a new and useful Improvement in Angle Attachments for Dental Handpieces, of which the following is a specification, accompanied by drawings forming a part of the same, in which—

Figure 1 is a side view of my improved attachment. Fig. 2 is a side view shown in central longitudinal sectional view in order to disclose the operating parts. Fig. 3 is a detached view of the tubular shank, provided with a grooved bearing for the rotating head. Fig. 4 is a detached view of the adjustable bearing ring. Fig. 5 is a sectional view of the same on the line 5—5, Fig. 4. Fig. 6 is a detached view of the latch by which the head is held from rotation. Fig. 7 is a detached view of the latch actuating cam. Fig. 8 is a detached end view of the adjustable bearing for the rotating spindle.

Similar reference letters and figures refer to similar parts in the different views.

My present invention relates to certain improvements in the angle attachment forming the subject of United States Patent No. 522,291, granted to Charles H. Davis July 3, 1894, to which reference may be had for a description of those operating parts which are not concerned in my present invention and are not herein described.

The objects of my invention are to simplify the construction, increase the durability and provide for the adjustment of the operating parts, in order to take up any lost motion resulting from continued use, and these objects are accomplished by the construction and arrangement of parts as hereinafter described, the novel features being pointed out in the annexed claims.

Referring to the accompanying drawings, 1 denotes a tubular hand piece adapted to be held by the operator and preferably made of hard rubber. Held within one end of the hand piece 1 is a tubular shank 2, shown detached in Fig. 3. The shank 2 is provided at one end with an angularly disposed cylindrical projection 3 of less diameter than the shank 2, in order to provide a shoulder 4. The projection 3 is provided with a V-shaped groove 5 adapted to receive a split bearing ring 6, triangular in cross section to fit the groove 5. A rotary head 7 is provided with a socket 8, which slips over the bearing ring 6 and is attached thereto by means of screws 9, having pointed tips which enter countersunk recesses 10 in the bearing ring. The screws 9 prevent the removal of the head 7 and rotatably attach it to the shank 2. As the head is turned upon the projection 3, the bearing ring 6 is rotated in the V-shaped groove 5 and, as the surfaces wear, the lost motion is taken up by tightening the screws 9, which compress the split bearing ring against the bottom of the V-shaped groove 5.

The socket 8 is provided with a series of notches 11 adapted to receive one end 12 of a latch 13, capable of being moved longitudinally in a groove 14 in the tubular shank 2. The rear end of the latch 13 is bent outwardly at 15 to enter a groove 16 in a rotatable cam ring 17, which is held from longitudinal movement on the shank 2 by the end 18 of the hand piece 1 and by a bead 19 projecting from the shank 2. The groove 16 is placed obliquely to the axis of the cam ring 17, as shown by broken lines in Fig. 7, and the ring 17 is preferably provided with an outer milled surface to enable it to be rotated about the shank 2 in order to impart longitudinal movement to the sliding latch 13.

Operative mechanism for rotating the tool holding socket 20 is inclosed in the head 7, substantially like that shown for a similar purpose in the aforesaid patent to Davis, No. 522,291, to which rotary motion is imparted by the geared end 21 of a rotating spindle 22, having its geared end enlarged at 23 to fill the shank 2 and thereby form a bearing for the geared end of the spindle. The opposite end of the spindle 22 is journaled in a bushing 24, provided with an external screw thread held in the screw threaded end of the hand piece 1. The bushing 24 is split at 25 throughout a greater portion of its length to render it compressible as it is screwed into the hand piece 1, in order to prevent its becoming loosened by jar or otherwise. The rotating spindle 22 is provided with a collar 26, against which the end of the bushing 24 bears. Whenever any lost motion occurs, due to the wear of the rotating spindle 22 or its connected parts, the bushing 24 is screwed into the hand piece 1 to maintain a suitable bearing surface against the collar 26.

I claim,

1. A dental handpiece having a tubular shank provided with an angularly disposed projection having an annular groove, an adjustable bearing ring rotatably mounted in said groove, a tool carrying head attached to said ring, and means for compressing said ring to adjust it in said groove.

2. A dental handpiece having a tubular shank provided with an annular grooved bearing, a tool carrying head rotatably mounted on said bearing, a split ring fitting the groove of said bearing, and screws carried by said head and entering recesses in said ring.

3. A dental handpiece having a shank provided with a bearing with a V-shaped annular groove, a V-shaped split ring held in said groove, a head having a socket mounted on and inclosing said bearing and said V-shaped ring, and tightening screws carried by said head and entering said V-shaped ring.

4. A dental handpiece having a longitudinally grooved shank, an annular bearing on said shank, a tool carrying head rotatably mounted on said annular bearing and provided with notches, a latch slidable in the groove of said shank and adapted to engage said notches, and means for imparting movement to said latch in said groove.

5. A dental handpiece having a shank with a longitudinal groove and an annular bearing on said shank, a notched head rotatably mounted in said bearing, a latch slidable in the groove of said shank and adapted to engage the notches of said head, and a cam ring rotatably mounted on said shank and engaging said latch to move the same into or out of engagement with said rotatable head.

JAMES A. MacDONALD.

Witnesses:
PENELOPE COMBERBACH,
RUFUS B. FOWLER.

---

Copies of this patent may be obtained for five cents each, by addressing the "Commissioner of Patents, Washington, D. C."